United States Patent
Fujimine et al.

(10) Patent No.: US 6,802,792 B2
(45) Date of Patent: Oct. 12, 2004

(54) OIL PRESSURE CONTROL DEVICE OF AUTOMATIC TRANSMISSION

(75) Inventors: Takuya Fujimine, Anjo (JP); Akira Fukatsu, Anjo (JP); Kazuyuki Noda, Anjo (JP); Masahiko Ando, Anjo (JP); Kazutoshi Nozaki, Toyota (JP); Toshiki Kanada, Toyota (JP)

(73) Assignees: Aisin AW Co., Ltd. (JP); Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 10/602,026

(22) Filed: Jun. 24, 2003

(65) Prior Publication Data

US 2004/0063534 A1 Apr. 1, 2004

(30) Foreign Application Priority Data

Jun. 28, 2002 (JP) ........................................ 2002-191521

(51) Int. Cl.$^7$ .............................................. F16H 31/00
(52) U.S. Cl. ..................................................... 475/116
(58) Field of Search ................................ 475/131, 133, 475/116

(56) References Cited

U.S. PATENT DOCUMENTS

| | | | | |
|---|---|---|---|---|
| 5,649,880 A | * | 7/1997 | Tsutsui et al. | 477/125 |
| 5,919,108 A | * | 7/1999 | Takagi | 475/127 |
| 6,319,165 B1 | * | 11/2001 | Itou et al. | 475/119 |
| 6,494,801 B1 | * | 12/2002 | Ohtake et al. | 475/5 |
| 6,634,991 B2 | * | 10/2003 | Itou et al. | 477/156 |
| 2004/0038765 A1 | * | 2/2004 | Fujimine et al. | 475/122 |

FOREIGN PATENT DOCUMENTS

JP          2000-205407        7/2000

* cited by examiner

Primary Examiner—Dirk Wright
(74) Attorney, Agent, or Firm—Lorusso, Loud & Kelly

(57) ABSTRACT

In an oil pressure control device, a clutch apply control valve is provided in an oil passage between a control valve and a linear solenoid valve. The clutch apply control valve is changed between a first position where an input port and an output port are connected so as to supply a control pressure to a control oil chamber, and a second position where another input port and the output port are connected so as to supply the control oil chamber with a D range pressure, instead of the control pressure. Therefore, the clutch apply control valve makes it possible to reliably supply an engaging pressure to a clutch even in the case of a failure of the control valve or the like to ensure good responsiveness of the clutch.

16 Claims, 3 Drawing Sheets

FIG.2

OPERATION TABLE

| | CLUTCH | | | BRAKE | | | | OWC | | | SOLENOID | | |
|---|---|---|---|---|---|---|---|---|---|---|---|---|---|
| | C-1 | C-2 | C-3 | B-1 | B-2 | B-3 | B-4 | F-1 | F-2 | F-3 | SL1 | SL2 | SR |
| P | | | | | | | | | | | × | ○ | × |
| REV | | | ○ | (○) | | | ○ | ○ | | | × | ○ | × |
| N | | | | | | | | | | | × | ○ | × |
| 1ST | ○ | | | | | | (○) | | | ○ | × | ○ | × |
| 2ND | ○ | | | | (○) | ○ | | ○ | ○ | | × | ○ | × |
| 3RD | ○ | | ○ | (○) | | ● | | ○ | | | × | ○ | × |
| 4TH | ○ | ○ | ● | | | ● | | | | | × | ○ | × |
| 5TH | | ○ | ○ | ○ | | ● | | | | | × | × | ○ |
| N-D SHIFT | ×-○ | | | | ×-○ | | | | | ×-○ | ○-× | ○-× | ○ |

(○) INDICATES ENGINE BRAKING
● INDICATES ENGAGEMENT WITHOUT TORQUE TRANSFER
× INDICATES DISENGAGEMENT

○ ON
× OFF

OIL PRESSURE CONTROL DEVICE OF AUTOMATIC TRANSMISSION

CROSS-REFERENCE TO RELATED APPLICATION

This application claims, under 35 USC 119, priority of Japanese Application No. 2002-191521 filed Jun. 28, 2003.

INCORPORATION BY REFERENCE

The disclosure of Japanese Patent Application No. 2002-191521 filed on Jun. 28, 2002 including the specification, drawings and abstract is incorporated herein by reference in its entirety.

BACKGROUND OF THE INVENTION

1. Field of the Invention

The present invention relates to an oil pressure control device of an automatic transmission installed in a motor vehicle and, more particularly, to an oil pressure control device of an automatic transmission capable of securing the supply of an engaging pressure to a friction engagement element even if a control valve or the like, which normally supplies the engaging pressure to the friction engagement element, cannot operate normally (hereinafter, referred to as "failure").

2. Description of the Related Art

Automatic transmission oil pressure control devices (hereinafter, also referred to as "oil pressure control devices") conventionally have a plurality of shift valves, control valves, etc., that are interconnected so as to form a hydraulic control circuit and which are able to appropriately change the shift speed in accordance with operation of a shift lever. Some of such oil pressure control devices are designed to adjust and supply a predetermined range pressure via a control valve to a hydraulic servo of a clutch used at the time of starting the vehicle in motion, such as a clutch C-1.

The control valve mentioned above typically has a spool with a land spacing which is narrower than the port spacing between an input port and a drain port, so as to enhance the responsiveness in controlling the pressure received from a linear solenoid valve or the like. However, with a control valve having such a structure, there is the possibility that small bits of foreign substances in the automatic transmission fluid (ATF) (referred to hereinafter as "oil") will cause valve sticking. If such a failure (valve sticking) occurs, there is the danger of loss of good performance in starting the vehicle in motion due to difficulty in supply of the engaging pressure to the clutch C-1. In order to avoid this, an oil passage between the control valve and the clutch C-1 hydraulic servo is provided with a changeover valve that changes over to a different path so as to allow supply of the engaging pressure even if a failure occurs. However, in this structure, there is the possibility that the presence of the changeover valve may reduce the responsiveness of the clutch C-1. The aforementioned valve sticking may also occur in a linear solenoid valve as mentioned above. For example, in the event of intermediate sticking, wherein the spool is stopped at an intermediate position, generally referred to as an "on-state" (or "off-state") failure, etc., output of the control pressure becomes difficult and it becomes difficult to engage the clutch C-1.

SUMMARY OF THE INVENTION

Accordingly, it is an object of the present invention to provide an oil pressure control device for an automatic transmission that is designed so as to secure the supply of the engaging pressure to a friction engagement element even if a failure occurs in a control valve or a linear solenoid valve (solenoid valve), and that thereby solves the aforementioned problems.

In accordance with the present invention, where a pressure adjusting unit includes, for example, a valve structure, and where the pressure adjusting unit is subject to intermediate sticking or the like, so that the output of an engaging pressure becomes difficult, it is possible to supply the original pressure from a second port of the pressure adjusting unit via a connecting oil passage and therefore supply oil pressure to the hydraulic servo.

In the present invention, the changeover valve conventionally provided between a control valve and a friction engagement element is omitted, so that responsiveness of the friction engagement element is improved. Furthermore, the changeover valve disposed between the control valve and the solenoid valve that together form the pressure adjusting unit makes it possible to secure good engaging pressure supply to the friction engagement element even if the control valve or the solenoid valve fails. For example, if the solenoid valve fails so that the output of the control pressure becomes difficult while the control valve is in a normal state, the changeover valve is switched to a second position. Therefore, instead of the control pressure, the original pressure from the connecting oil passage is supplied to the control oil chamber of the control valve, so that, for example, a first port and an output port of the control valve are connected, thus supplying the original pressure to the hydraulic servo. Therefore, in a case where the friction engagement element is a vehicle start clutch, it is possible to achieve, for example, the first forward speed and therefore move the vehicle. Furthermore, if the control valve fails (sticks) with the first port and the output port in communication, while the solenoid valve is in a normal state, the original pressure supplied to the first port can be supplied to the hydraulic servo via these two ports. On the other hand, if the control valve fails with the output port and a second port in communication, the original pressure from the connecting oil passage can be supplied to the hydraulic servo via these two ports.

Even in the case where the land spacing (interval) of the spool of the control valve is narrower than the spacing between the first port and the second port and where a spool becomes stuck at an intermediate position such that communication is not established with either one of the ports (generally referred to as "intermediate sticking"), the hydraulic servo can be supplied with the engaging pressure via the upstream and downstream connecting oil passage provided with the one-way valve.

In the present invention, the range pressure supplied via the manual valve can be used as the "original pressure."

Accordingly, the present invention makes it possible to favorably cope with a failure of a frequently used vehicle start (launch) clutch.

BRIEF DESCRIPTION OF THE DRAWINGS

FIG. 2 is an operation table indicating the states of friction engagement elements and the like for various shift speeds.

DETAILED DESCRIPTION OF THE PREFERRED EMBODIMENTS

Preferred embodiments of the present invention will be described hereinafter with reference to the accompanying drawings.

An automatic transmission installed in, for example, a vehicle or the like, includes an oil pressure control device 1 in accordance with the present invention, and an automatic speed change mechanism (gear mechanism) 10 that achieves, for example, five forward speeds and one reverse speed, through the control of the engagement states of a plurality of friction engagement elements (e.g., clutches C-1 to C-3, and brakes B-1 to B-4), based on oil pressure control of the oil pressure control device 1.

Figure 1:
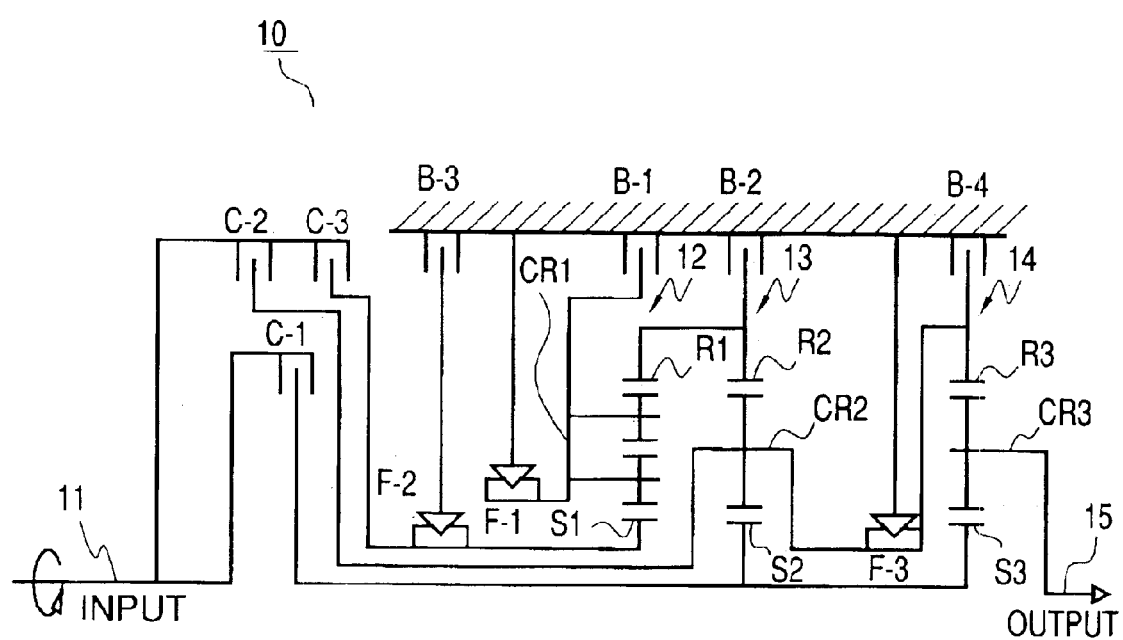
FIG. 1 is a skeletal diagram illustrating an automatic speed change mechanism to which the present invention is applicable.

As shown in FIG. 1, the automatic speed change mechanism 10 has an input shaft 11 and an output shaft 15. Arranged coaxially with the input shaft 11 and the output shaft 15 are a double-pinion planetary gear unit 12 having a sun gear S1, a carrier CR1 and a ring gear R1, and a simple planetary gear unit 13 having a sun gear S2, a carrier CR2 and a ring gear R2, as well as a simple planetary gear unit 14 having a sun gear S3, a carrier CR3 and a ring gear R3. Disposed at an input side of the automatic speed change mechanism 10 are a radially inward-side clutch C-1, a clutch C-2 and a clutch C-3 in what is generally referred to as a double-clutch arrangement, in which two clutches are juxtaposed.

The clutch C-3 is connected to the sun gear S1. The sun gear S1 is restricted to rotation in one direction by a one-way clutch F-1 that is engaged via engagement of a brake B-3. The carrier CR1 meshing with the sun gear S1 is restricted to rotation in one direction by the one-way clutch F-1, and can be freely fixed by the brake B-1. The ring gear R1 meshing with the carrier CR1 is connected to the ring gear R2. The ring gear R1 and the ring gear R2 are freely fixable by a brake B-2.

The clutch C-2 is connected to the carrier CR2 that meshes with the ring gear R2 and the carrier CR2 is connected to the ring gear R3. The carrier CR2 and the ring gear R3 are restricted to rotation in one direction by a one-way clutch F-3, and are freely fixable by a brake B-4. The clutch C-1 is also connected to the sun gear S2 and the sun gear S3. The sun gear S2 meshes with the carrier CR2, and the sun gear S3 meshes with the carrier CR3. The carrier CR3 meshes with the ring gear R3, and is connected to the output shaft 15.

Operation of the automatic speed change mechanism 10 will next be described with reference to FIGS. 1 and 2. FIG. 2 is an operation table indicating the states of various clutches, brakes and solenoids in operation of the automatic speed change mechanism 10 in the D (drive) range. As indicated in FIG. 2, for the first forward speed (1ST), the clutch C-1 is engaged and the one-way clutch F-3 is actuated while a linear solenoid valve SL1 is off, a linear solenoid valve SL2 is on, and a solenoid valve SR is off, as described in detail below with reference to FIG. 3. Then, as indicated in FIG. 1, the rotation of the input shaft 11 is input to the sun gear S3 via the clutch C-1, and rotation of the ring gear R3 is restricted to one direction by the one-way clutch F-3. Due to rotation of the sun gear S3 at input speed and the ring gear R3 being restricted in rotation, the carrier CR3 rotates at a reduced speed. Therefore, the output shaft 15 outputs forward rotation as the first forward speed. That is, the automatic speed change mechanism 10 achieves the first forward speed.

During engine braking (coasting) in the first forward speed, the brake B-4 is operated instead of the one-way clutch F-3 as indicated in FIG. 2, so that rotation of the ring gear R3 is fixed in such a fashion as to prevent idle rotation, thus achieving the first forward speed as in the above-described case.

For the second forward speed (2ND), the clutch C-1 is engaged and the brake B-3 is engaged and the one-way clutch F-1 and the one-way clutch F-2 are actuated while the linear solenoid valve SL1 is off, the linear solenoid valve SL2 is on, and the solenoid valve SR is off, as indicated in FIG. 2. Then, as indicated in FIG. 1, the one-way clutch F-2, engaged via the engagement of the brake B-3, restricts rotation of the sun gear S1 to one direction, and the one-way clutch F-1 restricts rotation of the carrier CR1 to one direction, thus restricting rotation of the ring gears R1 and R2 to one direction as well. When the rotation of the input shaft 11 is input to the sun gear S2 via the clutch C-1, the carrier CR2 and the ring gear R3 rotate at a reduced speed due to the sun gear S2 rotating at the input speed and the ring gear R2 being restricted in rotation. In addition, as the rotation of the input shaft 11 is input to the sun gear S3 via the clutch C-1, the carrier CR3 rotates at a reduced speed which is slightly faster than the first forward speed, due to the sun gear S3 rotating at the input speed and the ring gear R3 rotating at the reduced speed. Therefore, the output shaft 15 outputs forward rotation as the second forward speed.

During engine braking (coasting) in the second forward speed, the brake B-2 is engaged instead of the one-way clutch F-1 and the one-way clutch F-2 as indicated in FIG. 2, so that the ring gear R1 and the ring gear R2 are fixed to prevent idle rotation thereof, thus achieving the second forward speed as in the above-described case.

For the third forward speed (3RD), the clutch C-1 is engaged and the clutch C-3 is engaged and the one-way clutch F-1 is actuated while the linear solenoid valve SL1 is off, the linear solenoid valve SL2 is on, and the solenoid valve SR is off, as indicated in FIG. 2. Then, as indicated in FIG. 1, the engagement of the clutch C-3 causes the input rotation to be input to the sun gear S1, and the one-way clutch F-1 restricts rotation of the carrier CR1 to one direction. Due to rotation of the sun gear S1 at the input speed and the carrier CR1 being restricted in rotation, the ring gear R1 and the ring gear R2 rotate at a reduced speed. As the rotation of the input shaft 11 is input to the sun gear S2 via the clutch C-1, the carrier CR2 and the ring gear R3 rotate at a relatively fast reduced-speed due to the sun gear S2 rotating at the input speed and the ring gear R2 rotating at a reduced speed. In addition, as the rotation of the input shaft 11 is input to the sun gear S3 via the clutch C-1, the carrier CR3 rotates at a reduced speed which is slightly faster than the second forward speed due to the sun gear S3 rotating at the input speed and the ring gear R3 rotating at the reduced speed. Therefore, the output shaft 15 outputs forward rotation as the third forward speed.

During engine braking (coasting) in the third forward speed, the brake B-1 is operated instead of the one-way clutch F-1 as indicated in FIG. 2, so that the carrier CR1 is fixed in such a fashion as to prevent idle rotation thereof, thus achieving the third forward speed as in the above-described case.

For the fourth forward speed (4TH), the clutch C-1 is engaged and the clutch C-2 is engaged while the linear solenoid valve SL1 is off, the linear solenoid valve SL2 is on and the solenoid valve SR is off, as indicated in FIG. 2. Then, as indicated in FIG. 1, the engagement of the clutch C-2 causes the input rotation to be input to the carrier CR2 and the ring gear R3. Furthermore, the rotation of the input shaft 11 is input to the sun gear S3 via the clutch C-1. Due to the sun gear S3 and the ring gear R3 both rotating at the input speed, direct-coupled rotation is achieved, that is, the carrier CR3 also rotates at the input speed. Therefore, the output shaft 15 outputs forward rotation as the fourth forward speed.

For the fifth forward speed (5TH), the clutch C-2 is engaged, the clutch C-3 is engaged and the brake B-1 is engaged while the linear solenoid valve SL1 is on, the linear solenoid valve SL2 is off, and the solenoid valve SR is on, as indicated in FIG. 2. Then, as indicated in FIG. 1, the engagement of the clutch C-3 causes the input rotation to be input to the sun gear S1, and the brake B-1 fixes (brakes) the carrier CR1. Due to the sun gear S1 rotating at the input speed and the carrier CR1 being fixed, the ring gears R1 and R2 rotate at a reduced speed. With the carrier CR2 and the ring gear R3 rotating at the input speed, due to the engagement of the clutch C-2, and the ring gear R2 rotating at the reduced speed, the sun gears S2 and S3 rotate at an increased speed. Furthermore, due to rotation of the sun gear S3 at the increased speed and the ring gear R3 rotating at the input speed, the carrier CR3 rotates at an increased speed. Therefore, the output shaft 15 outputs forward rotation as the fifth forward speed.

For reverse (REV), the clutch C-3 and the brake B-4 are engaged and the one-way clutch F-1 is actuated, while the linear solenoid valve SL1 is off, the linear solenoid valve SL2 is on, and the solenoid valve SR is off, as indicated in FIG. 2. Then, as indicated in FIG. 1, the engagement of the clutch C-3 causes the input rotation to be input to the sun gear S1, and the one-way clutch F-1 restricts rotation of the carrier CR1 to one direction. Due to the sun gear S1 rotating at the input speed and the carrier CR1 being restricted in rotation, the ring gears R1 and R2 rotate at a reduced speed. Due to engagement of the brake B-4, the carrier CR2 and the ring gear R3 are fixed against rotation. Therefore, due to the ring gear R2 rotating at the reduced speed and the carrier CR2 being fixed, the sun gears S2 and S3 rotate in the reverse direction. Due to the sun gear S3 having reverse rotation and the ring gear R3 being fixed, the carrier CR3 also rotates in reverse. Thus, the output shaft 15 outputs reverse rotation.

During engine braking (coasting) in the first reverse speed, the brake B-1 is engaged instead of the one-way clutch F-1 as indicated in FIG. 2, so that the carrier CR1 is fixed to prevent idle rotation thereof, thus achieving reverse drive as in the above-described case.

In neutral (N) range, all of the clutches, the brakes and the one-way clutches are in a disengaged (or unoperated) state while the linear solenoid valve SL1 is off, the linear solenoid valve SL2 is on, and the solenoid valve SR is off, as indicated in FIG. 2. Therefore, a neutral state is established in which the rotation of the input shaft 11 is not transferred to the output shaft 15 (see FIG. 1).

For the N-D shift, the linear solenoid valves SL1, SL2 change the control pressures PSL1, PSL2 from a low pressure to a high pressure, and the solenoid valve SR is on, as indicated in FIG. 2. Therefore, the brake B-2 and the clutch C-1 are changed from a released state to an engaged state, and the one-way clutch F-3 is changed from its non-actuated state to the actuated state.

Figure 3:
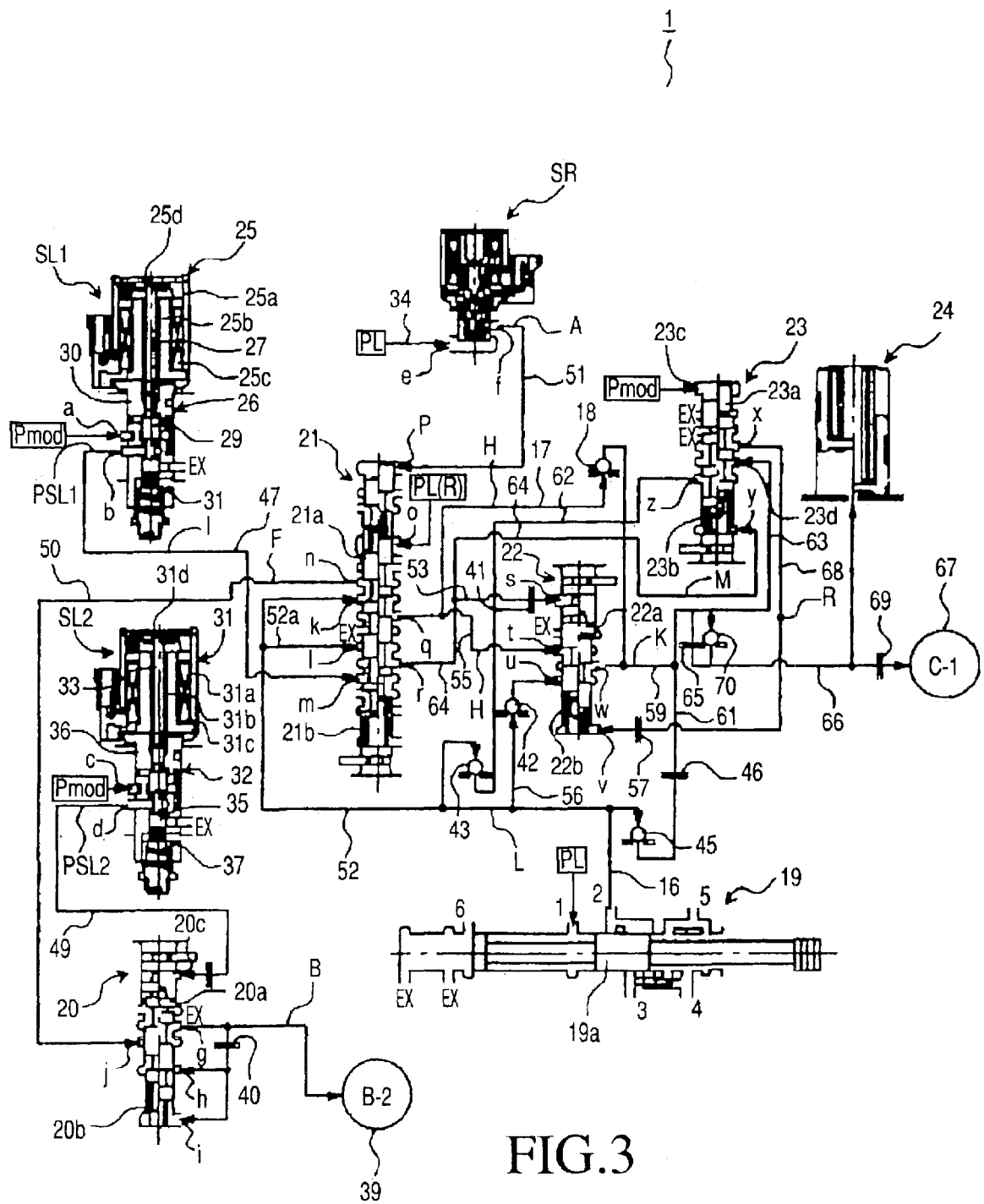
FIG. 3 is a schematic view of an oil pressure control circuit of an oil pressure controller for an automatic transmission in accordance with the present invention.

Next, the oil pressure control device 1 will be described with reference to FIG. 3. FIG. 3 schematically illustrates portions of the oil pressure control device 1 related to the present invention. Actually, the oil pressure control device 1 has many more valves, oil passages, etc., and hydraulically controls, for example, a lubricant circuit, a lockup clutch, and hydraulic servos for controlling engagement of the friction engagement elements of the automatic speed change mechanism 10 described above. In FIG. 3, "EX" indicates a drain port.

As shown in FIG. 3, the oil pressure control device 1 includes a manual valve 19, the linear solenoid-valves SL1, SL2 of the normally open type, the solenoid valve SR of the normally closed type, a brake control valve 20, a clutch apply control valve (changeover valve) 21, a clutch control valve 22, a clutch lock valve 23, and a C-1 accumulator 24.

The manual valve 19 operates in accordance with manual operations by a driver so as to switch a line pressure PL (oil pressure supplied to a port 1) to one of a port 2 and a port 5 in accordance with the position of a spool 19a.

The linear solenoid valve SL1 has a solenoid portion 25 and a pressure-adjusting valve portion 26, and changes a solenoid pressure in response to a control signal from a control unit (not shown). In the solenoid portion 25, a coil 25c is sandwiched between a yoke 25a and a stator core 25b. A shaft 27 extends slidably through a central hole 25d of the stator core 25b and contacts a spool 29 of the pressure-adjusting valve portion 26. The pressure-adjusting valve portion 26 includes a valve body 30 and the spool 29 that is slidably fitted in the body 30. The spool 29 is urged upward in FIG. 3 by a compressed spring 31. The valve body 30 has an input port a that receives a modulator pressure Pmod adjusted by a modulator valve (not shown) or the like, and an output port b for outputting the control pressure PSL1. The output port b is connected in communication with an input port m of the clutch apply control valve 21 via an oil passage 47.

The linear solenoid valve SL2 has a solenoid portion 31 and a pressure-adjusting valve portion 32, and changes a solenoid pressure in response to a control signal from the control unit. In the solenoid portion 31, a coil 31c is sandwiched between a yoke 31a and a stator core 31b. A shaft 33 extends slidably through a central hole 31d of the stator core 31b and contacts a spool 35 of the pressure-adjusting valve portion 32. The pressure-adjusting valve portion 32 includes a valve body 36 and the spool 35 that is slidably fitted in the body 36. The spool 35 is urged upward in FIG. 3 by a compressed spring 37. The valve body 36 has an input port c that receives the aforementioned modulator pressure Pmod, and an output port d for outputting the control pressure PSL2. The output port d is connected in communication with a control oil chamber 20c of the brake control valve 20 via an oil passage 49.

The solenoid valve SR switches on/off in response to a control signal from the control unit, so as to output the line pressure PL as a signal pressure A or to discontinue the output. The solenoid valve SR has an input port e that receives the line pressure PL via an oil passage 34, and an output port f for outputting the signal pressure A to an oil passage 51.

As used herein the term "line pressure" refers to a pressure obtained by adjusting the oil pressure from an oil pump (oil pressure source which is not shown) via a primary regulator valve (not shown), and the term "range pressure" refers to a pressure that is generated for each range by inputting the line pressure to a manual valve that is switched by operation of a shift operating member (not shown), such as a shift lever, a switch, etc.

The term "original pressure" as used herein is intended to include the "line pressure" and the "range pressure".

The brake control valve 20 has a spool 20a movable upward and downward in FIG. 3, a spring 20b that urges the spool 20a upward, a control oil chamber 20c to which the control pressure PSL2 is supplied from the linear solenoid valve SL2 via the oil passage 49, an output port g for supplying a hydraulic servo 39 for the brake B-2 with an engaging pressure B, oil chambers h, i to which the engaging pressure B output from the output port g is fed back via an orifice 40, and an input port j to which a supply pressure F output from the clutch apply control valve 21 is supplied via an oil passage 50.

The clutch apply control valve 21 has a spool 21a movable upward and downward in FIG. 3, a spring 21b that urges the spool 21a upward, input ports k, l that, when the manual valve 19 is set in a forward run range (e.g., the D range), receive the forward run D range pressure (L) via an oil passage 52 and the shift valve 19, an input port m to which the control pressure PSL1 from the output port b of the linear solenoid valve SL1 is supplied via the oil passage 47, an output port n for outputting the supply pressure F when set at a position indicated by the left-side half illustration in FIG. 3, an input port o to which the R (reverse) range pressure based on the line pressure PL is supplied, a port p to which the signal pressure A from the solenoid valve SR is supplied by the oil passage 51, an output port q for outputting a supply pressure H based on the D range pressure (L) via an oil passage 55, and an output port r for outputting the control pressure PSL1 received from the linear solenoid valve SL1 as a control pressure I to an oil passage 64.

That is, the clutch apply control valve 21 has the input port m to which the oil pressure from the linear solenoid valve SL1 is supplied, the input port l to which the D range pressure (L) is input as an original pressure via an oil passage 52a branching from the oil passage (connecting oil passage) 52, and the output port r that is connected to the control oil chamber s of the clutch control valve 22 and the oil chamber y of the clutch lock valve 23. The control valve 21 is switched, responsive to the on-off operation of the solenoid valve SR, between a left-half illustrated position (first position) where the input port m and the output port r are connected to supply the control pressure PSL1 as the control pressure I to the control oil chamber s and the oil chamber y, and a right-half illustrated position (second position) where the input port l and the output port r are connected to supply the D range pressure (L) via the oil passage 52 as an original pressure, instead of the control pressure I based on the control pressure PSL1, to the control oil chamber s and the oil chamber y.

An oil passage 17 branches from the oil passage 55 so as to connect the output port q of the clutch apply control valve 21 and the output port w of the clutch control valve 22, via the input port t. The oil passage 17 connects to the hydraulic servo 67 of the clutch C-1 at the downstream side of the clutch control valve 22. Furthermore, the oil passage 17 is provided with a check ball (one-way valve) 18 that allows only the supply of oil pressure to the hydraulic servo 67. That is, the check ball 18 allows action of oil pressure from the clutch apply control valve 21 to the hydraulic servo 67, and prevents action of oil pressure in the opposite direction. It should be apparent that although this embodiment employs a check ball as a one-way valve, a different type of check valve may be used instead.

The clutch control valve 22 has a spool 22a movable upward and downward in FIG. 3, a spring 22b that urges the spool 22a upward, a control oil chamber s to which the control pressure I from the output port r of the clutch apply control valve 21 is supplied via an oil passage 53 and an orifice 41, and an input port t that receives the supply pressure H from the output port q of the clutch apply control valve 21 via the oil passage 55. The input port t can be placed in communication with a drain port EX of the control valve 21 via the oil passage 55 and the out port q of the control valve 21, during the pressure adjustment performed by the control valve 22.

The control valve 22 further has an input port u to which the D range pressure (L) via an oil passage 56 is supplied as the original pressure via a check ball 42, an oil chamber v to which a feedback pressure R from an output port x of the clutch lock valve 23 is supplied via an oil passage 68 and an orifice 57, and an output port w for outputting an engaging pressure K based on the supply pressure H. The engaging pressure K is supplied to the input port 23d of the clutch lock valve 23 via the oil passages 59, 63, and is also supplied to the hydraulic servo 67 via the oil passage 59, an orifice 65, an oil passage 66, and an orifice 69.

The check ball 42, disposed in the oil passage 56, allows the D range pressure (L) from the manual valve 19 to be supplied to the input port u of the clutch control valve 22 and blocks the oil pressure from the manual valve 19 via the input port u when the control valve 22 is positioned in the right-half illustrated position.

A check ball 70 is disposed in parallel to the orifice 65 so as to block action of oil pressure from the clutch control valve 22 to the hydraulic servo 67 and to allow action of oil pressure in the opposite direction. Therefore, the engaging pressure K is supplied to the oil passage 66 via the orifice 65 during engagement of the clutch C-1, and is drained through the oil passage 61 or the oil passages 61, 63 via the check ball 70 as well as the orifice 65 during disengagement of the clutch C-1. The oil passage 61 is provided with an orifice 46 and a check ball 45. The check ball 45 blocks action of oil pressure from the manual valve 19 to the hydraulic servo 67, and allows action of oil pressure in the opposite direction.

The control valve 22 outputs the D range pressure (L) supplied to the input port u, as the engaging pressure K, adjusted in accordance with the control pressure I supplied to the control oil chamber s, and outputs the supply pressure H from the clutch apply control valve 21 to the hydraulic servo 67 as the engaging pressure K. The control valve 22 operates dependent on the position of the spool 22a in either a supply state wherein the input port u and the output port w are connected to supply the engaging pressure K, or in a drain state where the output port w is connected to the input port t so as to drain oil via the output port q of the clutch apply control valve 21, and thereby supplies appropriate engaging pressure K to the hydraulic servo 67.

Although in the presently described embodiment, the "pressure adjusting unit" is formed by the clutch control valve 22 and the linear solenoid valve SL1, the pressure adjusting unit is not so limited. It should be apparent that the pressure adjusting unit may also be formed by, for example, a single linear solenoid valve that performs both the function of the linear solenoid valve SL1 and the function of the clutch control valve 22.

The clutch lock valve 23 has a spool 23a movable upward and downward in FIG. 3, a spring 23b that urges the spool 23a upward, an output port x for supplying feedback pressure R to the oil chamber v of the clutch control valve 22 via the oil passage 68 and an orifice 57, an oil chamber y to which the control pressure I (i.e., a changeover pressure M) is supplied via the oil passage 64, a port z for draining the engaging pressure K via an oil passage 62 and a check ball 43, the port 23c to which the modulator pressure Pmod is supplied, and the input port 23d to which the engaging pressure K is supplied via the oil passage 63. The check ball 43 allows action of oil pressure from the clutch lock valve 23 and blocks action of oil pressure in the opposite direction.

The C-1 accumulator 24 is connected to the oil passage 66 between the check ball 70 and the orifice 69, and reduces the shock of torque reduction when the engaging pressure K is drained from the hydraulic servo 67.

The switching of the clutch apply control valve 21 between the first position and the second position can be controlled as follows. When the control valve 21 is at the left-half illustrated position (first position) and the D range pressure (L) is supplied to the input port (first input port) u of the clutch control valve 22, the input port (second input port) t of the control valve 21 is in communication with the output port q of the clutch apply control valve 21, and drains the oil pressure. Therefore, the control valve 22 is controlled (pressure-adjusted) by the control pressure PSL1 via the ports m, r, s. In the time-dependent change of the engaging pressure K, the pressure adjustment is continued until a point in time at which a completion pressure for completing the engagement of the clutch C-1 is reached. When that completion pressure is reached, the D range pressure (L) is immediately supplied as an engagement holding pressure, instead of the engagement completion pressure, based on the pressure adjustment. The timing of changing of the supply oil pressure may be determined not only on the basis of the time of reaching the engagement completion pressure, but also on the basis of timing of change of rotation of the input shaft 11 (see FIG. 1) of the automatic speed change mechanism 10.

When the clutch apply control valve 21 is changed to the right-half illustrated position (second position) by the solenoid valve SR, the D range pressure (L) is supplied to the control oil chamber s of the clutch control valve 22 via the ports l, r of the control valve 21, so that the clutch control valve 22 is locked in the right-half illustrated position. In this case, the input port t of the control valve 22 is shut, and the input port u and the output port w of the valve 22 are connected, so that the hydraulic servo 67 is supplied with the D range pressure (L) as the engagement holding pressure. At this time, the clutch lock valve 23 is also locked in the right-half illustrated position. For example, even if the clutch control valve 22 is stuck, the setting of the clutch apply control valve 21 in the right-half illustrated position will allow the supply of oil pressure to the hydraulic servo 67 via the input port k and the output port q of the control valve 21 and the check ball 18.

Next, operation of the oil pressure control device 1 will be described. For example, when the oil pump (oil pressure source) is driven by the engine (not shown), the line pressure PL is generated, and is supplied to the port e of the solenoid valve SR, the port 1 of the manual valve 19, etc. in this state, the N-D shift control, responsive to the shift lever being shifted to the D range is started in order to start the vehicle forward from a stop.

Then, the linear solenoid valve SLI is controlled by, for example, the control unit (not shown), so as to supply the control pressure PSL1 (changed to the high pressure side) from the output port b. Furthermore, the solenoid valve SR is switched ON, so that the signal pressure A is output, and the clutch apply control valve 21 assumes the left-half illustrated position. Therefore, the input port m and the output port r are connected, so that the control pressure PSL1 is input as the control pressure I to the oil chamber s of the clutch control valve 22 and the oil chamber y of the clutch lock valve 23 via the oil passage 47, the clutch apply control valve 21 and the oil passage 64.

Next, the clutch control valve 22 is gradually moved from the left-half illustrated position to the right-half illustrated position so as to output the D range pressure (L) received at the input port u, in such a fashion as to restrict oil flow in accordance with the position of the spool 22a, based on the control pressure PSL1, from the output port w to the hydraulic servo 67 of the clutch C-1 and the clutch C-1 accumulator 24 via the oil passages 59, 66. In this case, the spool 22a is moved between a supply state where the input port u and the output port w are connected, and a drain state where the output port w is connected to the input port t which, in turn, is in communication with the drain port EX via the oil passage 55 and the output port q.

The clutch lock valve 23 is moved to the left-half illustrated position by a modulator pressure Pmod greater than the sum of the elastic force of the spring 23b and the control pressure PSL1 input as the changeover pressure M. In this position, the input port 23d and the output port x are connected, and the engaging pressure K received from the output port w is output as the feedback pressure R to the oil chamber v via the oil passage 68.

In this case, since the clutch apply control valve 21 is held in the left-half illustrated position by signal pressure A of the solenoid valve SR, the input port k and the output port n are connected so that the D line pressure (L) is supplied from output port n as a supply pressure F to the oil passage 50. Through the control of the linear solenoid valve SL2, an oil pressure is supplied to a hydraulic servo 39 of the brake B-2 via the brake control valve 20, so that the brake B-2 temporarily engages. The engagement of the brake B-2 is discontinued when the clutch apply control valve 21 is changed to the right-half illustrated position as described below.

Under control of the linear solenoid valve SL1, the clutch C-1 assumes an approximately engaged state. At that time, the solenoid valve SR is turned off, so that the clutch apply control valve 21 assumes the right-half illustrated position. Therefore, the input port m is shut and the input port l is connected to the output port r, so that the D line pressure (L), received at port 1 via the oil passage 52, is supplied as the control pressure M to the oil chamber y of the clutch lock valve 23 and to the control oil chamber s of the clutch control valve 22 via the oil passage 64.

Therefore, the clutch lock valve 23 assumes the right-half illustrated position because the oil chamber y is supplied with the D range pressure (L) that is higher than the control pressure PSL1 supplied up to that time. Hence, the feedback pressure R is blocked, and the port 23d and the drain port EX are connected, so that the oil pressure in the oil chamber v of the clutch control valve 22 is drained via the oil passage 68. Furthermore, since the clutch control valve 22 is at the right-half illustrated position, the input port u and the output port w are connected, so that the D line pressure (L) supplied to the port u is supplied as the engaging pressure K to the hydraulic servo 67 of the clutch C-1 via the oil passages 59, 66. Therefore, the clutch C-1 is completely engaged.

When the clutch lock valve 23 is in the right-half illustrated position, the port 23d and the port z are connected, and the hydraulic servo 67 and the oil passage 62 are connected via the oil passages 63, 66. However, since the oil passage from the manual valve 19 to the check ball 43 is supplied with the D range pressure (L), the engaging pressure K of the hydraulic servo 67 is not drained. Likewise, although the hydraulic servo 67 is also connected to the oil passage 61, the oil passage from the manual valve 19 to the check ball 45 is supplied with the D range pressure (L). Therefore, the engaging pressure K of the hydraulic servo 67 is not drained.

Due to the clutch C-1 engaged as described above and the one-way clutch F-3 being correspondingly operated, the automatic speed change mechanism 10 is shifted to the first forward speed, so that the vehicle will be promptly started in motion.

From the first forward speed to the fourth forward speed, the hydraulic servo 67 of the clutch C-1 continues to receive the D range pressure (L) as indicated in FIG. 2.

Thus, according to this embodiment, the clutch control valve 22 can be supplied with the D range pressure (L) via different paths by changing the position of the clutch apply control valve 21 by operation of the solenoid valve SR. For example, where the clutch control valve 22 or the linear solenoid valve SL1 (forming a pressure adjusting unit) has the so-called intermediate sticking or the like, so that the output of the engaging pressure K becomes difficult, the D range pressure (L) can also be supplied as an original pressure from the input port (second port) t of the clutch control valve 22 via the oil passage (connecting oil passage) 52 by changing the position of the clutch apply control valve 21 through operation of the solenoid valve SR. Therefore, the supply of oil pressure to the hydraulic servo 67 can be assured.

If, while the clutch control valve 22 is in a normal state, and the linear solenoid valve SL1 fails in its on-state (generally-termed on-state failure) or is stopped due to valve sticking or the like when the output port b is closed, so that the output of the control pressure PSL1 becomes difficult, it is possible to shut the input port m and the output port r and connect the input port l to the output port r by switching the clutch apply control valve 21 to the right-half illustrated position by turning off the solenoid valve SR responsive to a control signal of the control unit (not shown). Therefore, instead of the control pressure PSL1, which is not supplied, the D range pressure (L) is supplied via the oil passage 52 via the ports l, r, to the control oil chamber s of the clutch control valve 22 so as to change the valve to the right-half illustrated position, so that the D range pressure (L) supplied via the oil passage 56 can be supplied to the hydraulic servo 67 via the input port u and the output port w. Therefore, the clutch C-1 is engaged, thereby allowing the vehicle to move.

If the clutch control valve 22 is stopped at the right half illustrated position due to valve sticking or the like, while the linear solenoid valve is operating normally, the D range pressure (L) supplied via the oil passage 56 can be supplied to the hydraulic servo 67 of the clutch C-1 via the input port u and the output port w which are connected.

If the clutch control valve 22 cannot be moved from the left-half illustrated position due to the valve sticking or the like, the D range pressure (L) received at the input port k of the clutch apply control valve 21 can be supplied from the output port q to the input port t of the clutch control valve 22, and from output port w to the hydraulic servo 67, by switching the clutch apply control valve 21 to the right-half illustrated position by turning off the solenoid valve SR. This latter pressure supply to hydraulic servo 67 is also effective if the clutch control valve 22 undergoes the so-called intermediate sticking in which the spool 22a is stopped at an intermediate position.

Since the D range pressure (L) supplied from the output port q of the clutch apply control valve 21 in its right-half illustrated position is supplied to the oil passages 59, 66 via the oil passage 17 and the check ball 18, the hydraulic servo 67 can be supplied with the engaging pressure K via the oil passage 17 even if the clutch control valve 22 cannot output the engaging pressure K due to the intermediate sticking or the like. That is, for example, even in the case where the land interval of the clutch control valve 22 is narrower than the interval between the input port u and the input port t and where the spool 22a becomes stuck at an intermediate position such that communication is not established with respect to either one of the ports u, t (intermediate sticking), the hydraulic servo 67 can be supplied with the engaging pressure K via the oil passage 17.

Although in the embodiment described above the present invention is applied to the clutch C-1 serving as a vehicle launch clutch, it is possible to realize the described fail-safe control for reliability in any clutch engaging operation which is, frequently performed. Although a drain control for the hydraulic servo 67 of the clutch C-1 is adopted in the above-described embodiment, it may be omitted from the present invention. The present invention is applicable to any friction engagement element, including other clutches, brakes engaged for engine braking, etc., as long as there is a possibility that a control valve or the like associated with that friction engagement element may fail.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An oil pressure control device for an automatic transmission, comprising:

a hydraulic servo that engages and disengages a friction engagement element;

a pressure adjusting unit that adjusts an original pressure from an oil pressure source to provide an adjusted oil pressure and supplies the adjusted oil pressure to the hydraulic servo, the pressure adjusting unit having a first port to which the original pressure is supplied, an output port for outputting the adjusted oil pressure, and a second port for draining oil during a pressure adjustment;

a changeover valve having a first input port to which the original pressure is supplied, a drain port, and an original pressure output port that is selectively connectable to the first input port or the drain port; and a connecting oil passage connecting the first input port and the oil pressure source, wherein the second port of the pressure adjusting unit is connectable to the connecting oil passage via the original pressure output port.

2. The oil pressure control device according to claim 1, wherein the pressure adjusting unit includes a control valve, and a solenoid valve that supplies a control pressure for controlling the control valve, and wherein the control valve has a control oil chamber to which the control pressure is input, and wherein the changeover valve is disposed in a control pressure supply oil passage extending from the solenoid valve to the control valve, and has a second input port to which the control pressure from the solenoid valve is supplied, a third input port to which the original pressure is input via an oil passage branching from the connecting oil passage, and a control pressure output port connectable to the control oil chamber, and wherein the changeover valve is changed between a first position where the second input port and the control pressure output port are connected so as to supply the control pressure to the control oil chamber, and a second position where the third input port and the control pressure output port are connected so as to supply the control oil chamber with the original pressure via the connecting oil passage, instead of the control pressure.

3. The oil pressure control device according to claim 1, further comprising:
   a first oil passage that connects the original pressure output port of the changeover valve and the output port of the control valve, and
   a second oil passage branching from the first oil passage and connected to the hydraulic servo at a downstream side of the control valve, and
   wherein the second oil passage is provided with a one-way valve that allows only supply of an oil pressure to the hydraulic servo.

4. The oil pressure control device according to claim 2, further comprising:
   a first oil passage that connects the original pressure output port of the changeover valve and the output port of the control valve, and
   a second oil passage branching from the first oil passage and connected to the hydraulic servo at a downstream side of the control valve, and
   wherein the second oil passage is provided with a one-way valve that allows only supply of an oil pressure to the hydraulic servo.

5. The oil pressure control device according to claim 1, wherein the original pressure is a range pressure supplied via a manual valve.

6. The oil pressure control device according to claim 2, wherein the original pressure is a range pressure supplied via a manual valve.

7. The oil pressure control device according to claim 3, wherein the original pressure is a range pressure supplied via a manual valve.

8. The oil pressure control device according to claim 4, wherein the original pressure is a range pressure supplied via a manual valve.

9. The oil pressure control device according to claim 1, wherein the friction engagement element is a vehicle launch clutch.

10. The oil pressure control device according to claim 2, wherein the friction engagement element is a vehicle launch clutch.

11. The oil pressure control device according to claim 3, wherein the friction engagement element is a vehicle launch clutch.

12. The oil pressure control device according to claim 4, wherein the friction engagement element is a vehicle launch clutch.

13. The oil pressure control device according to claim 5, wherein the friction engagement element is a vehicle launch clutch.

14. The oil pressure control device according to claim 6, wherein the friction engagement element is a vehicle launch clutch.

15. The oil pressure control device according to claim 7, wherein the friction engagement element is a vehicle launch clutch.

16. The oil pressure control device according to claim 8, wherein the friction engagement element is a vehicle launch clutch.

* * * * *